United States Patent
Bart et al.

(10) Patent No.: US 11,817,086 B2
(45) Date of Patent: Nov. 14, 2023

(54) MACHINE LEARNING USED TO DETECT ALIGNMENT AND MISALIGNMENT IN CONVERSATION

(71) Applicant: Palo Alto Research Center Incorporated, Palo Alto, CA (US)

(72) Inventors: Evgeniy Bart, Santa Clara, CA (US); Margaret H. Szymanski, Santa Clara, CA (US)

(73) Assignee: XEROX CORPORATION, Norwalk, CT (US)

( * ) Notice: Subject to any disclaimer, the term of this patent is extended or adjusted under 35 U.S.C. 154(b) by 525 days.

(21) Appl. No.: 16/817,944

(22) Filed: Mar. 13, 2020

(65) Prior Publication Data
US 2021/0287664 A1 Sep. 16, 2021

(51) Int. Cl.
| | |
|---|---|
| G06N 3/08 | (2023.01) |
| G10L 15/14 | (2006.01) |
| G06N 20/00 | (2019.01) |
| G10L 15/06 | (2013.01) |
| G06F 16/28 | (2019.01) |
| G10L 17/26 | (2013.01) |

(52) U.S. Cl.
CPC .............. *G10L 15/144* (2013.01); *G06N 3/08* (2013.01); *G06N 20/00* (2019.01); *G06F 16/285* (2019.01); *G06F 2203/011* (2013.01); *G10L 17/26* (2013.01); *G10L 2015/0631* (2013.01)

(58) Field of Classification Search
CPC ... G10L 17/26; G06F 2203/011; G06F 16/285
See application file for complete search history.

(56) References Cited

U.S. PATENT DOCUMENTS

| | | | |
|---|---|---|---|
| 5,333,275 A | 7/1994 | Wheatley et al. | |
| 7,617,094 B2 | 11/2009 | Aoki et al. | |
| 7,822,607 B2 | 10/2010 | Aoki et al. | |
| 8,126,705 B2 | 2/2012 | Aoki et al. | |
| 8,200,493 B1* | 6/2012 | Cosatto | G06T 13/40 704/275 |
| 9,392,114 B1* | 7/2016 | Bobowski | H04M 3/5175 |
| 2006/0122834 A1* | 6/2006 | Bennett | G10L 15/1822 704/E15.047 |
| 2010/0332287 A1* | 12/2010 | Gates | G06Q 30/02 379/265.09 |
| 2015/0006655 A1* | 1/2015 | Fradin | H04L 51/216 709/206 |

(Continued)

OTHER PUBLICATIONS

Allen et al., "Detecting Disagreement in Conversations using Pseudo-Monologic Rhetorical Structure", Proceedings of the 2014 Conference on Empirical Methods in Natural Language Processing, Oct. 25-29, 2014, pp. 1169-1180.

(Continued)

*Primary Examiner* — Feng-Tzer Tzeng
(74) *Attorney, Agent, or Firm* — Mueting Raasch Group

(57) ABSTRACT

Digitized media is received that records a conversation between individuals. Cues are extracted from the digitized media that indicate properties of the conversation. The cues are entered as training data into a machine learning module to create a trained machine learning model. The trained machine learning model is used in a processor to detect other misalignments in subsequent digitized conversations.

19 Claims, 4 Drawing Sheets

(56) References Cited

U.S. PATENT DOCUMENTS

2016/0042276 A1* 2/2016 Lightner .................. G06N 5/04
706/12

OTHER PUBLICATIONS

Bart et al., "Temporally Coherent Role-Topic Models (TCRTM): Deinterlacing Overlapping Activity Patterns", ECML PKDD, 2015.
Germesin et al., "Agreement detection in multiparty conversation", Proceedings of the 2009 International Conference on Multimodal Interfaces—ICMI-MLMI '09.
Wang et al., "Automatic Identification of Speaker Role and Agreement/Disagreement in Broadcast Conversation", IEEE, 2011, pp. 5556-5559.

* cited by examiner

MACHINE LEARNING USED TO DETECT ALIGNMENT AND MISALIGNMENT IN CONVERSATION

SUMMARY

The present disclosure is directed to using machine learning to detect alignment and misalignment in conversation. In one embodiment, digitized media is received that represents a conversation between individuals. Cues are extracted from the digitized media that indicate properties of the conversation. The cues are entered as training data into a machine learning module to create a trained machine learning model. The trained machine learning model is used in a processor to detect other misalignments in subsequent digitized conversations.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures. The drawings are not necessarily to scale.

DETAILED DESCRIPTION

Figure 1:
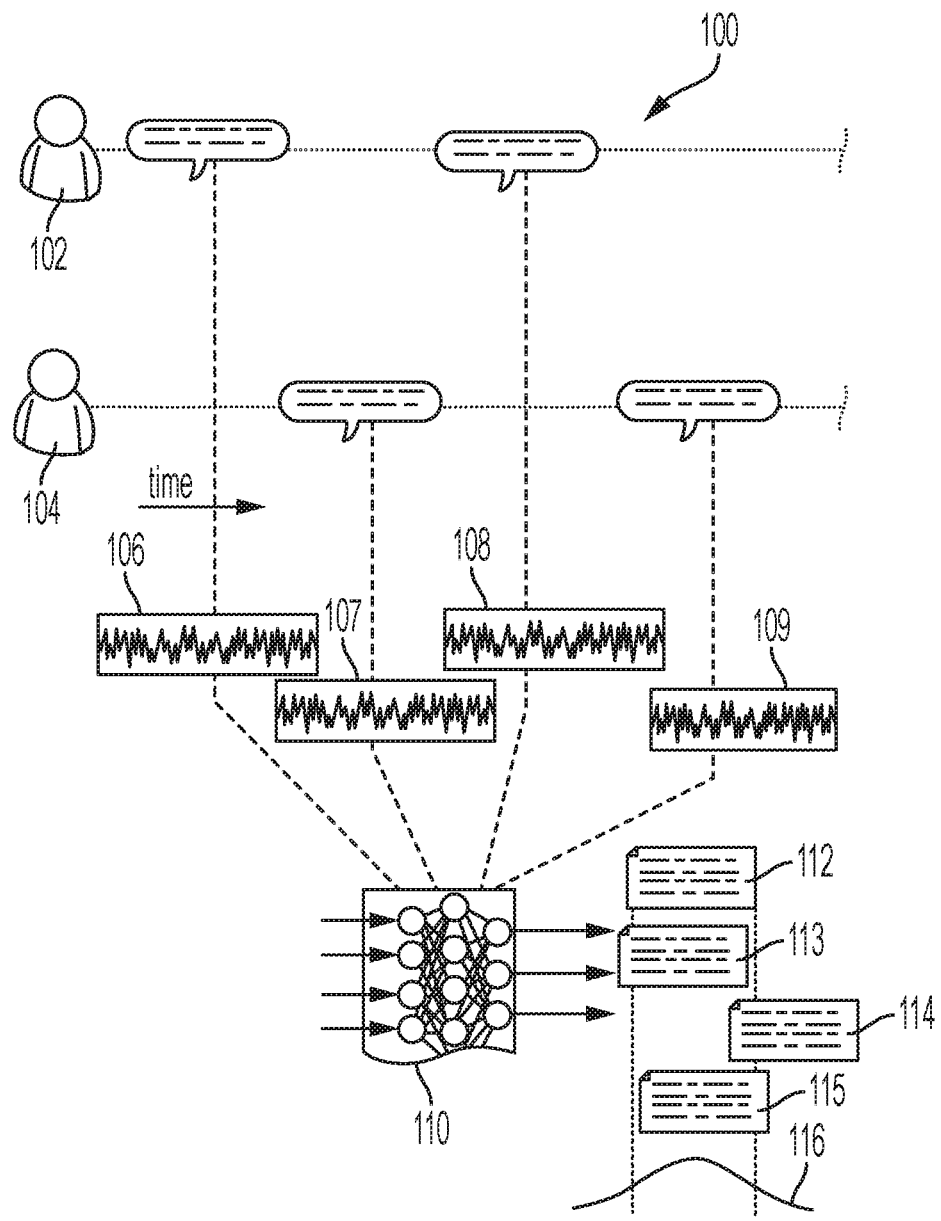
FIG. 1 is a diagram showing detection of alignment in a conversation according to an example embodiment.

The present disclosure relates to computer analysis of conversations. There have been recent advances in speech recognition that allow computing devices to recognize both speech (e.g., for dictation into a word processor) and meaning (e.g., for automated language translation). These capabilities have been put to a number of uses, such as in personal assistant applications implemented in mobile devices and home speakers, real-time machine translation, etc. For example, an assistant application can recognize a series of words, e.g., a question such as "what is the temperature outside?," parse the meaning of the words/phrases, and perform a network search to provide an answer. Some more advanced systems can recognize meaning across multiple interactions, e.g., understanding a follow-up question such as "what is that in degrees Celsius?"

A more complicated task is the monitoring of a conversation between two parties. Generally, the parties take turns speaking, and the conversation is viewed as including those turns. In certain applications, the conversation may exist to achieve a goal. For example, in a customer support environment, one goal may be to service a request (e.g., order a product) or solve a problem (e.g., technical support). The turns in the conversation serve to exchange information necessary to achieve the goal, and this transfer of meaning generally defines the "flow" of the conversation.

The success of the conversation hinges on how well the interactions in the conversation are 'aligned.' This alignment is defined generally by agreement and mutual understanding, both of the content of the conversation and its context. Alignment may apply either to an individual turn in the conversation, or to the entire conversation. Alignment may fail in situations such as where one party mis-hears or misunderstands the other and/or where a party fails to perform as expected, for example, fails to answer a question. Alignment may fail where a party performs an unexpected act, for example, asks a non-sequitur question or tries to end the conversation when the other party still has unresolved questions. Another example of where alignment may fail is if parties disagree about outcomes or goals. For example, if one party feels an issue in question has been resolved, while the other party feels it hasn't, this could be a sign of misalignment applied to the entirety of the conversation, and not just to individual interactions or turns.

Automatically identifying misalignment in conversation is useful in a variety of applications. For example, in call centers, detection and analysis of misalignment between agents and customers can be used to improve performance. For example, the amount and frequency of misalignment can be used to score agents' performance. Determining the specific type of misalignment can be used as feedback to agents. Tracking of various measures of misalignment over time can help assess and improve the call center procedures and protocols. Quantifying alignment/misalignment allows, for example, determining whether a change to operating procedures improves customer understanding. Position of misalignment in a call helps understand customer issues; for example, misalignment at the beginning may indicate angry customers (issues with the product), misalignment at the end indicates dissatisfied customer (call center failed to resolve the problem). Change in alignment over time can be an indicator that the agent is successful in resolving, such as starting with a misaligned conversation but ending with an aligned conversation. The opposite could show that the agent is making things worse.

Automatically detecting alignment in conversation is difficult because it involves not only the recognition of individual phrases/sentences, but also determining the latent, implicit meaning/intent behind each turn in the conversation. No automated methods detecting alignment or misalignment currently exist, although some related problems (such as detecting agreement), have been addressed. In some cases, call center performance is tracked by using human analysis of a small sample of calls. For example, a sample of calls for each agent is scored periodically by human scorers and used for rating the agent's performance. Similarly, analysis of sample of all calls in a given call center, or all calls on a particular topic, could be used to measure and track other performance metrics. Similar manual processes are used for evaluation in many other contexts (for example, of doctor-patient or professional consultant conversations).

The problems with human-dependent scoring process include that only a small subset of calls can economically be analyzed. Even when sampling smaller samples, the cost is high, e.g., when the scorers need to have expertise in a specialized field to perform the scoring. Another issue that may occur is that the results can be often inconsistent between different scorers, as scorers may be using subjective judgements. In the embodiments described here, a machine learning approach is used to detect the presence and type of misalignment.

In FIG. 1, a diagram shows an example of detecting alignment in a conversation according to an example embodiment. One or more audio streams of a conversation 100 between a first party 102 and a second party 104 are recorded, although more than two parties may be involved. As indicated by waveforms 106-109, the audio signals of the conversation are digitized to form a digital audio stream.

Each of the blocks 106-109 indicates a "turn" in the conversation, where one or the other of the parties 102, 104 is speaking. In the example in FIG. 1, each party's speech is recorded in a separate audio channel or stream. In such cases the beginning and ending of turns can be identified using traditional audio analyses, e.g., looking at signal amplitude. The identity of the speaker for each turn can be implied by the stream in which the speech is found. In some other examples, the audio may be recorded as a single stream that mixes the speech of all parties. In such a case, the speakers in the conversation and their corresponding turns can be identified via machine learning.

A machine learning module 110 extracts cues 112-115 from the digital audio stream 106-109. In this example, the machine learning module 110 is shown as a neural network. It will be understood that a number of different machine learning algorithms may be used, and a multitude of different machine learning modules may be used at different levels of abstraction. The cues 112-115 may include any combination of latent topics, prosodic cues, textual representations etc., that can detect a misalignment in the conversation 100 between the first party 102 and the second party 104.

The cues 112-115 can be used in a number of ways. In some embodiments, the module 110 can be considered a supervised machine learning module. During training, preselected examples of conversation misalignments are identified (e.g., via human evaluators). This training data is fed into the machine learning module 110 during a training phase. Through an error detection and minimization process (e.g., backpropagation), the machine learning module 110 changes its internal state to improve results on the training data, and thus is considered to have been trained to detect misalignments. In other embodiments, the module 110 may use unsupervised or partially supervised methods to detect misalignment. As indicated by distribution 116, one way to determine misalignment is to determine the probability of each cue 112-115 occurring in the conversation 100 under the module 110's internal "normalcy model". In this case, cue 114 is centered outside some limit of the distribution 116, and so may be considered to indicate misalignment. The source from which this cue was extracted (e.g. the specific turn in the conversation) may be used to locate misalignment within the conversation. Other ways of determining misalignment may be used instead or in addition to what is shown. For example, determining misalignment may involve detecting a prosodic cue that indicates anger, annoyance, confusion, etc., detecting word patterns such as "I don't understand," "I'm confused," etc.

The trained machine learning model 110 (e.g., the data representing trained state of the machine learning structure) can be used in one or more processors to detect misalignments in subsequent digitized conversations, which may be considered a deployment of the trained machine learning module 110. The machine learning module can continue to learn after being deployed, e.g., through occasional audits by evaluators that detect misinterpreted cues and misalignments. These mistakes can be used to further train the machine and thereby reduce the errors in future alignment detection/classification tasks.

Figure 2:
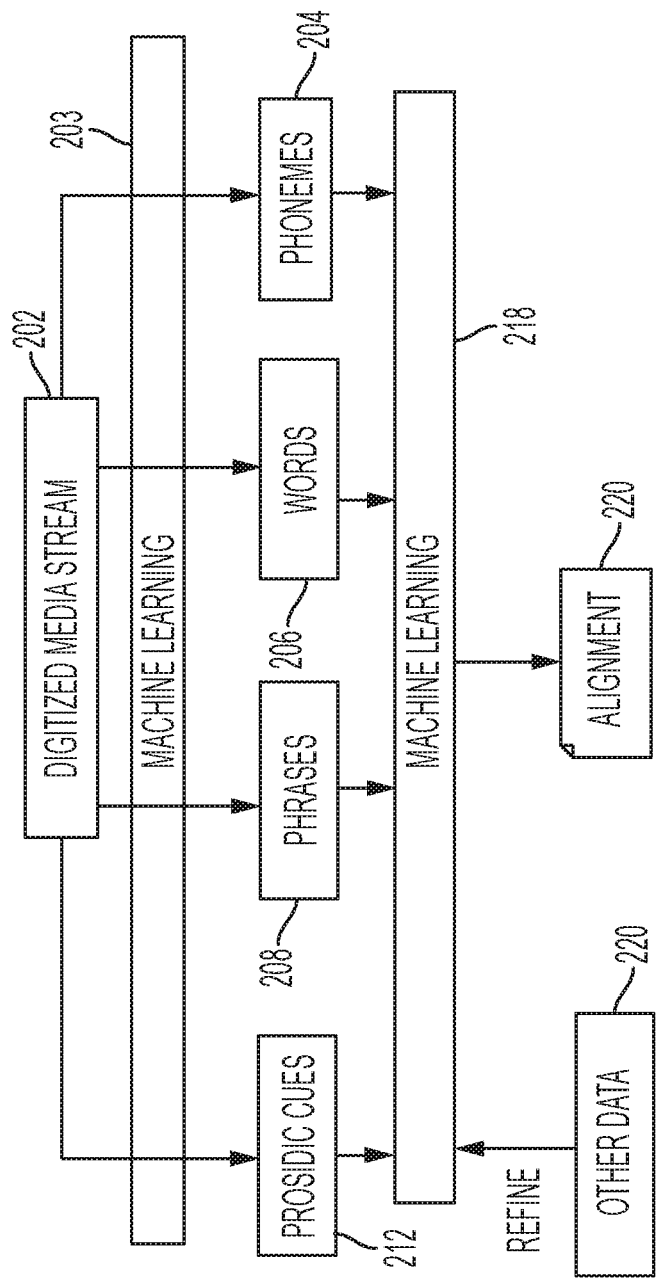
FIG. 2 is a diagram showing various data and cues used for machine learning according to an example embodiment.

As noted above, the input data may be analyzed by the machine learning system at multiple different levels. In FIG. 2, a block diagram shows an example of machine learned data that may be used in various embodiments. At the basic level, the data is a digitized media stream 202 that includes at least audio, but may also include other relevant data if available instead of or addition to audio, such as video or text (e.g., if the conversation occurs in a text-based application). This media stream 202 can be used to derive additional information, as indicated by machine learning module 203. This module 203 can obtain the information either explicitly (through a use of a specialized module, such as a word detector or a latent topic model) or implicitly (by a higher-level algorithm such as a deep neural network). For example, low-level language features such as phonemes 204, words 206, and/or specific phrases of interest 208 may be detected. As another example, prosodic cues 212 may be extracted from the media stream 202.

In some embodiments, a text representation of the call (e.g., a transcript) either is provided by the customer, or can be extracted automatically from the audio. In these cases, additional higher-level cues can be constructed based on this representation, which include phrases/sentences and semantics/meaning. In addition, this representation can be used to infer latent topics. The topics can be discovered by topic models such as latent Dirichlet allocation (LDA), as well as hidden state discovered by hidden Markov models (HMM). Note that LDA 'latent topics' are often different from human definition of 'the topic of the conversation.'

Finally, a machine learner 218 (e.g., a deep neural network, or a support vector machine (SVM), etc.) is used to predict, based on the features described above, whether the conversation turn in question is aligned with the previous turn. This prediction 220 may include a hard or soft binary indicator (alignment/misalignment) as well as other data, such as the type of misalignment (e.g., intentional or accidental) and the source of the misalignment (e.g., one party or both parties). Generally, the machine learner 218 is trained on a training set, and can be further trained or fine-tuned during use by inputting other data 222. This other data 222 may include any of the data/cues 204, 206, 208, 212 as well as human-supplied ground truth labels (e.g., based on audits of past conversations).

This system allows automatic detection of misalignment in conversation and determination of its type. This is in contrast to previous methods that required humans to perform such evaluation. Fully automatic detection and analysis have significant advantages over human analysis. For example, the methods described herein can be used to analyze a large corpus of conversations fully, without the need for subsampling. The proposed method also allows for consistent detection and scoring, because all calls can be evaluated by the same algorithm. This is in contrast to previous methods, where different human scorers evaluated different calls, and the biases of individual scorers affected the evaluations.

Figure 3:
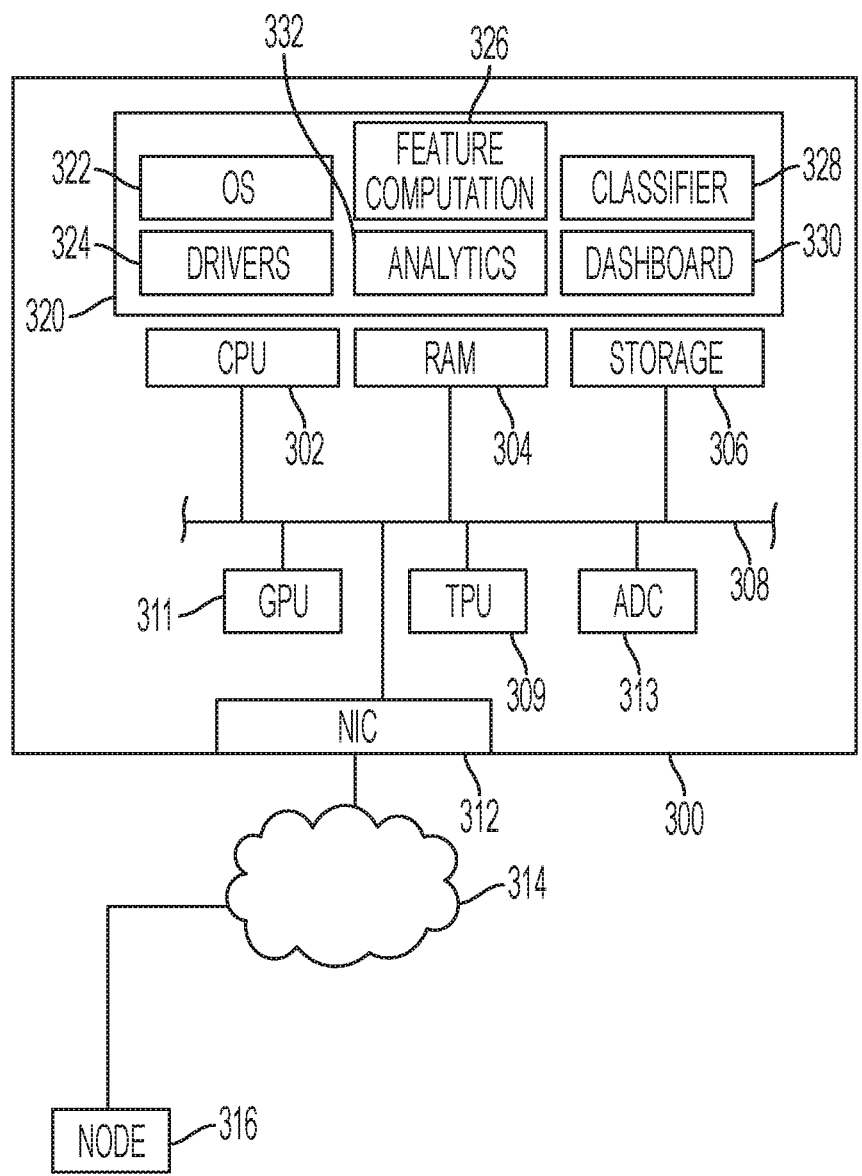
FIG. 3 is a block diagram of an apparatus according to an example embodiment.

The methods and processes described above can be implemented on computer hardware, e.g., workstations, servers, as known in the art. In FIG. 3, a block diagram shows an apparatus 300 that may be used to implement methods according to an example embodiment. The apparatus 300 includes one or more processors 302 such as a central processing unit, co-processor, digital signal processor, etc. The processor 302 is coupled to memory, which may include both random access memory 304 and persistent storage 306, via one or more input/output busses 308. Other general-purpose or special-purpose hardware may be coupled to the bus 308, such as graphics processing unit (GPU) 311, tensor processing unit (TPU) 309, analog to digital converter (ADC), 313, and network interface 312. The hardware may be coupled via circuits and devices (e.g., microphones, analog and digital audio lines, amplifiers, etc.) that are operable to form a digital audio stream based on a recorded conversation between two or more parties.

The network interface 312 facilitates communications via a network 314 using wired or wireless media. The network 312 may be used to access other network nodes 306. These nodes 306 may be configured similarly to the apparatus 300 such that that the functions of the apparatus 300 may be implemented via multiple devices, e.g., via client-server arrangement, clustered computing, cloud computing, etc.

The apparatus 300 includes software 320 that facilitates detecting alignment or misalignment in conversations. The software 320 includes an operating system 322 and drivers 324 that facilitate communications between user-level programs and the hardware. In one implementation, the software 320 may implement a traditional supervised learning framework. In such a case, the framework may have a feature computation part 326 followed by a classifier 328, the latter classifying conversations or parts thereof as aligned or misaligned.

In other embodiments, alternative feature computation methods can be used. These alternate feature computations can include alternative low-level features, alternative ways to compute higher-level features (for example, using dynamic topic models rather than LDA or HMM), or completely automated feature learning (for example, using deep neural networks). Alternative classifiers can be used (many alternatives exist, including logistic regression, neural networks, including deep networks, etc.). Alternative formulations of the supervised problem can be used. For example, instead of using the current and the previous turns for feature extraction, use more turns further back. As another example, turns can be separated by speaker, and previous turns of the same speaker can be used to provide a baseline.

In addition, the feature computation and classification steps can be integrated in a single architecture. A popular example is deep learning, where both feature learning and classification are trained simultaneously and often help each other. Finally, a richer modeling approach can be conceived, where instead of a supervised classifier to answer the single question ("is there misalignment?"), the whole conversation is modeled (for example, using an HMM model), and some of the hidden states in that model indicate various properties of interest, including misalignment.

The alignment detection framework can be used to provide different services to end users. For example, the alignment data determined via the classifier 328 may used by a real-time dashboard 330. The dashboard 330 is updated after every call with alignment statistics, and may utilize a graphical user interface (GUI) showing each agent's performance. Sudden or gradual drops in performance compared to normal baseline for that agent can be detected and used to schedule breaks, adjust working hours, etc., in order to reduce stress and prevent burnout. An analytics module 332 may provide high-statistical-power analysis of performance of individual agents or call center policies, e.g., as reflected in the performance by a plurality of agents that utilize the policies.

Figure 4:
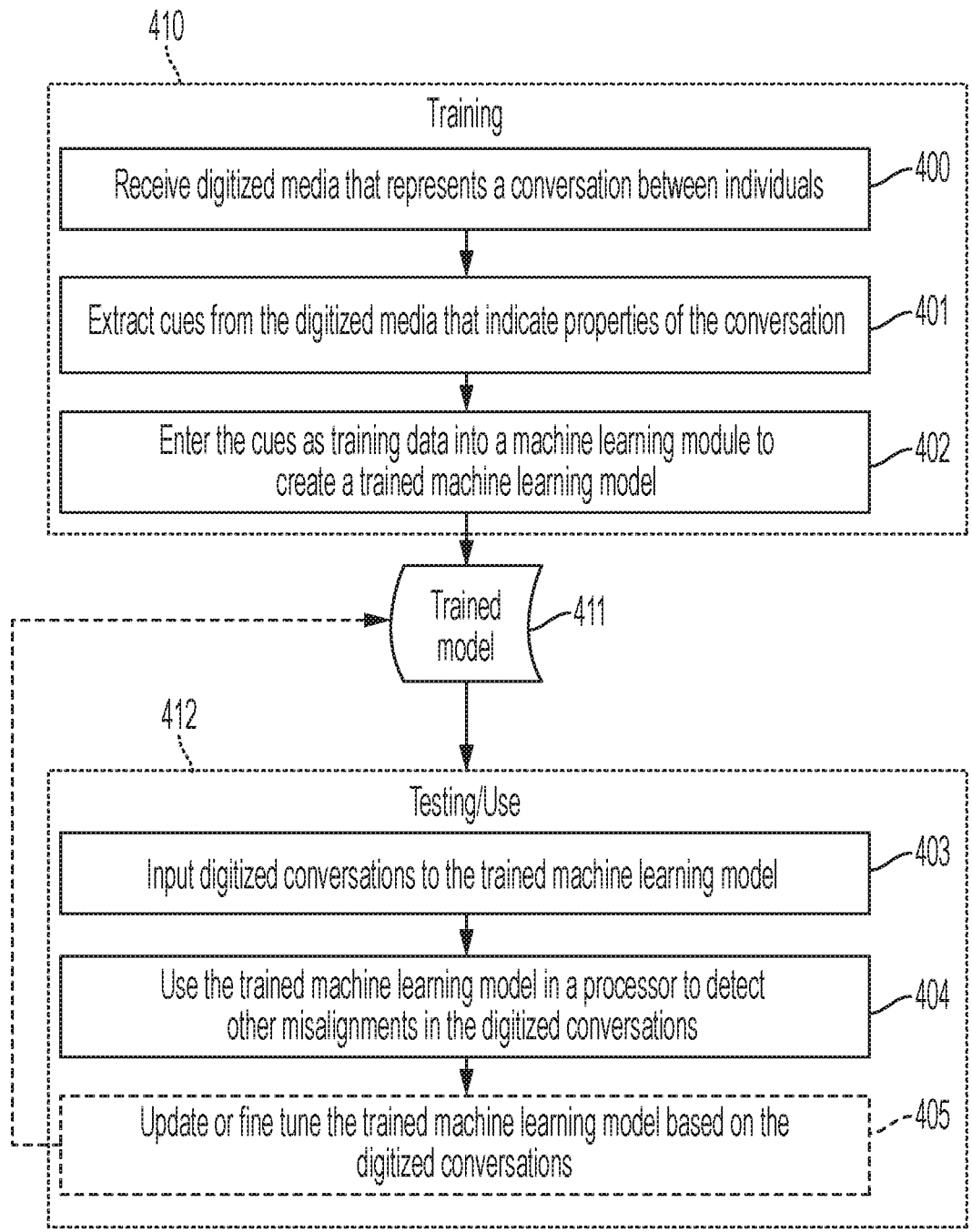
FIG. 4 is a flowchart of a method according to an example embodiment.

In FIG. 4, a flowchart shows a method according to an example embodiment. A first part of the method involves a training phase 410 that may be performed by a first processor. In the training phase 410, digitized media (e.g., text, audio/video streams) is received 400 that represents a conversation between two or more individuals. Cues are extracted 401 from the digital media stream that indicate properties of the conversation. The cues are at least one component of training data is entered 402 into a machine learning module to create a trained machine learning model 411. The training data may include any combination of digital media streams, extracted cues, or an additional external sources of training data (e.g., publicly available datasets, human-created annotations).

The trained machine learning model 411 can be passed (e.g., as stored instructions and data) to a second processor which performs a use phase 412 (also sometimes referred to as a testing phase). Note that the second processor may be the same as the first processor. Subsequent digitized conversations are input 403 to the trained model 403. These may include conversations previously used for training, as well as new, previously unseen conversations. The trained model is used 404 in the second processor to detect misalignments in these digitized conversations. Optionally, the machine learning module may be further trained or fine-tuned 405 using any combination of digitized media, extracted cues, and human-supplied ground truth labels associated with the subsequent digitized conversations.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination and are not meant to be limiting, but purely illustrative. It is intended that the scope of the invention be limited not with this detailed description, but rather determined by the claims appended hereto.

The invention claimed is:

1. A method comprising:
   receiving digitized media that represents a conversation between individuals;
   extracting cues from the digitized media that indicate properties of the conversation;
   entering the cues as training data into a machine learning module to create a trained machine learning model that detects misalignments in subsequent conversations between individuals, wherein misalignment is a lack of agreement and mutual understanding between the individuals of content and context of the content of the subsequent conversations; and using the trained machine learning model in a processor to detect other misalignments in subsequent digitized conversations;
wherein the trained machine learning model detects misalignments in subsequent digitized conversations between individuals by determining a probability of each cue occurring in the subsequent digitized conversations under a normalcy model.

2. The method of claim 1, wherein extracting the cues comprises:
extracting lower-level cues from the digitized media; and
constructing higher-level cues based on the lower level cues, wherein the higher-level cues comprise latent topics associated with the conversation.

3. The method of claim 2, wherein constructing the higher-level cues comprises processing the lower-level cues using at least one of a latent Dirichlet allocation and a hidden Markov model.

4. The method of claim 1, wherein the machine learning module comprises a support vector machine.

5. The method of claim 1, wherein the cues comprise prosodic cues.

6. The method of claim 1, wherein extracting the cues is performed by a deep neural network.

7. The method of claim 1, wherein the conversation is a customer support session, and wherein using the trained machine learning model to detect the other misalignments comprises using the trained machine learning model to evaluate call performance of customer service agents based on the other misalignments.

8. The method of claim 7, wherein evaluating the call performance comprises displaying a real time dashboard that displays call performance of an agent relative to a baseline.

9. The method of claim 7, wherein evaluating the call performance comprises providing statistics of a plurality of agents in a call center, the statistics used to evaluate a call center policy.

10. The method of claim 1, wherein the digitized media includes one or more of audio and video streams.

11. The method of claim 1, wherein the training data further comprises any combination of the digitized media and an external source of training data.

12. The method of claim 1, further comprising fine-tuning the machine learning module using any combination of the subsequent digitized conversations and human-supplied ground truth labels.

13. A system comprising:
a circuit operable to receive digitized media that represents a conversation between at least two people; and
a first processor coupled to the circuit and operable to:
extract cues from the digitized media that indicate properties of the conversation; and
enter the cues as training data into a machine learning module to create a trained machine learning model; and
a second processor configured to:
receive the trained machine learning model from the first processor; and
use the trained machine learning model in a processor to detect other misalignments in subsequent digitized conversations between individuals, wherein misalignment is a lack of agreement and mutual understanding between the individuals of content and context of the content of the subsequent digitized conversations;
wherein the trained machine learning model detects misalignments in subsequent digitized conversations between individuals by determining a probability of each cue occurring in the subsequent digitized conversations under a normalcy model.

14. The system of claim 13, wherein extracting the cues comprises:
extracting lower-level cues from the digitized media; and
constructing higher-level cues based on the lower level cues, wherein the higher-level cues comprise latent topics associated with the conversation.

15. The system of claim 14, wherein the digitized media comprises a textual transcript of the conversation, the lower level cues further comprising textual cues obtained from the textual transcript.

16. The system of claim 14, wherein constructing the higher-level cues comprises processing the lower-level cues using at least one of a latent Dirichlet allocation and a hidden Markov model.

17. The system of claim 13, wherein the training data further comprises any combination of the digitized media and an external source of training data.

18. The system of claim 13, wherein the first processor is further operable to fine tune the machine learning module using any combination of the subsequent digitized conversations and human-supplied ground truth labels.

19. The system of claim 13, wherein the conversation is a customer support session, and wherein using the trained machine learning model to detect the other misalignments comprises using the trained machine learning model to evaluate call performance of customer service agents based on the other misalignments.

* * * * *